Nov. 15, 1932.  B. FÖRSTER  1,887,885
DEVICE FOR THE PRODUCTION AND INSERTION OF THE WIRE
SPIRALS INTO THE RING SLEEVES OF SNAP RINGS
Filed Dec. 23, 1930  4 Sheets-Sheet 1
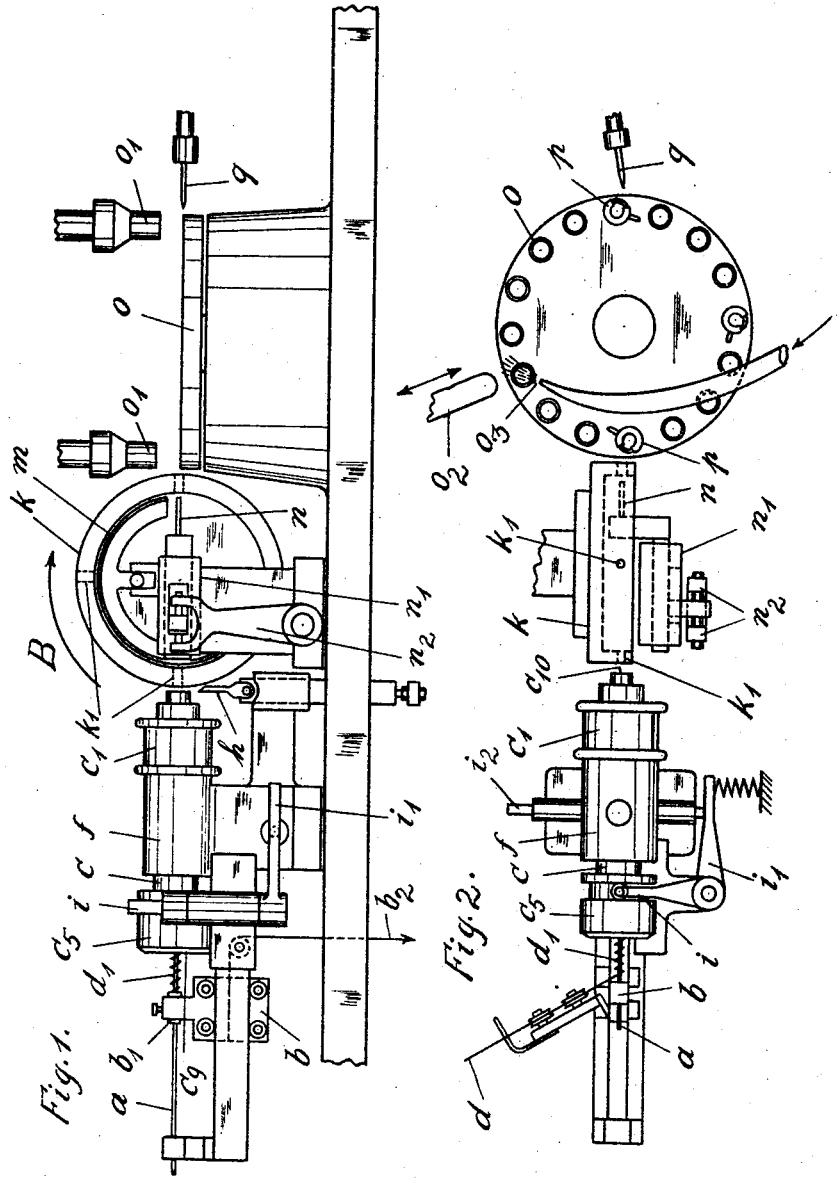
Inventor:
Bernhard Förster

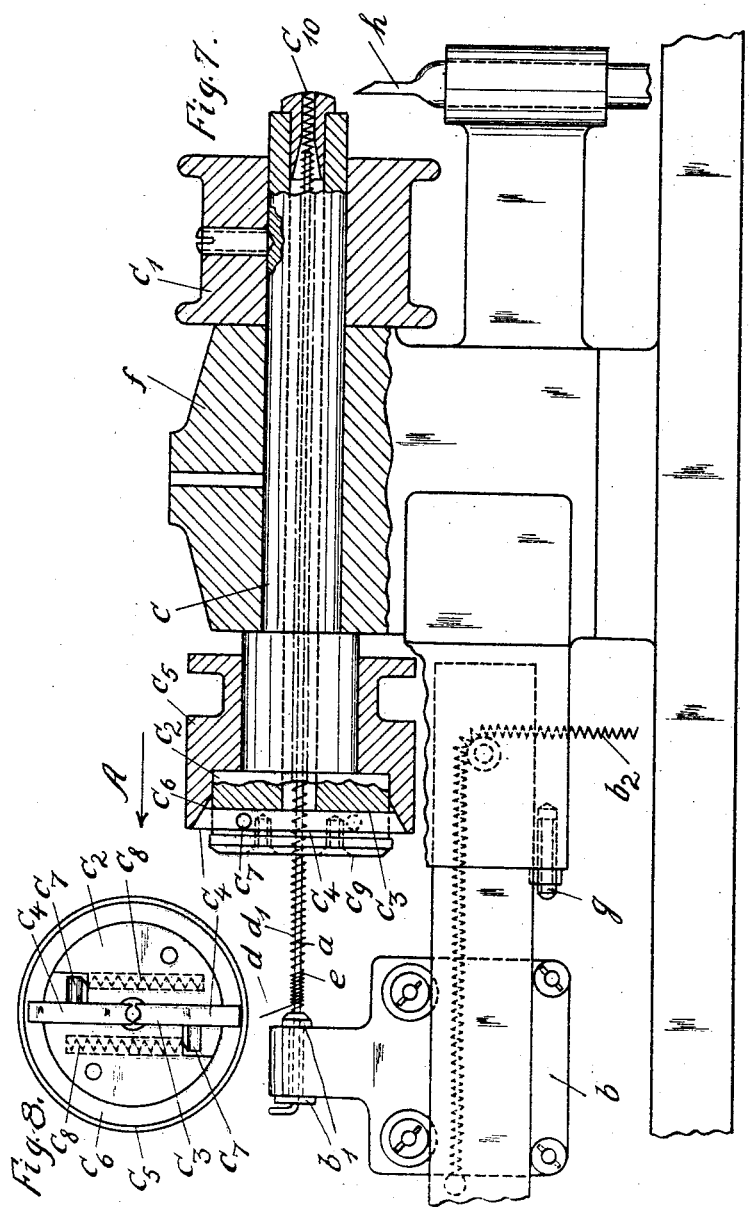

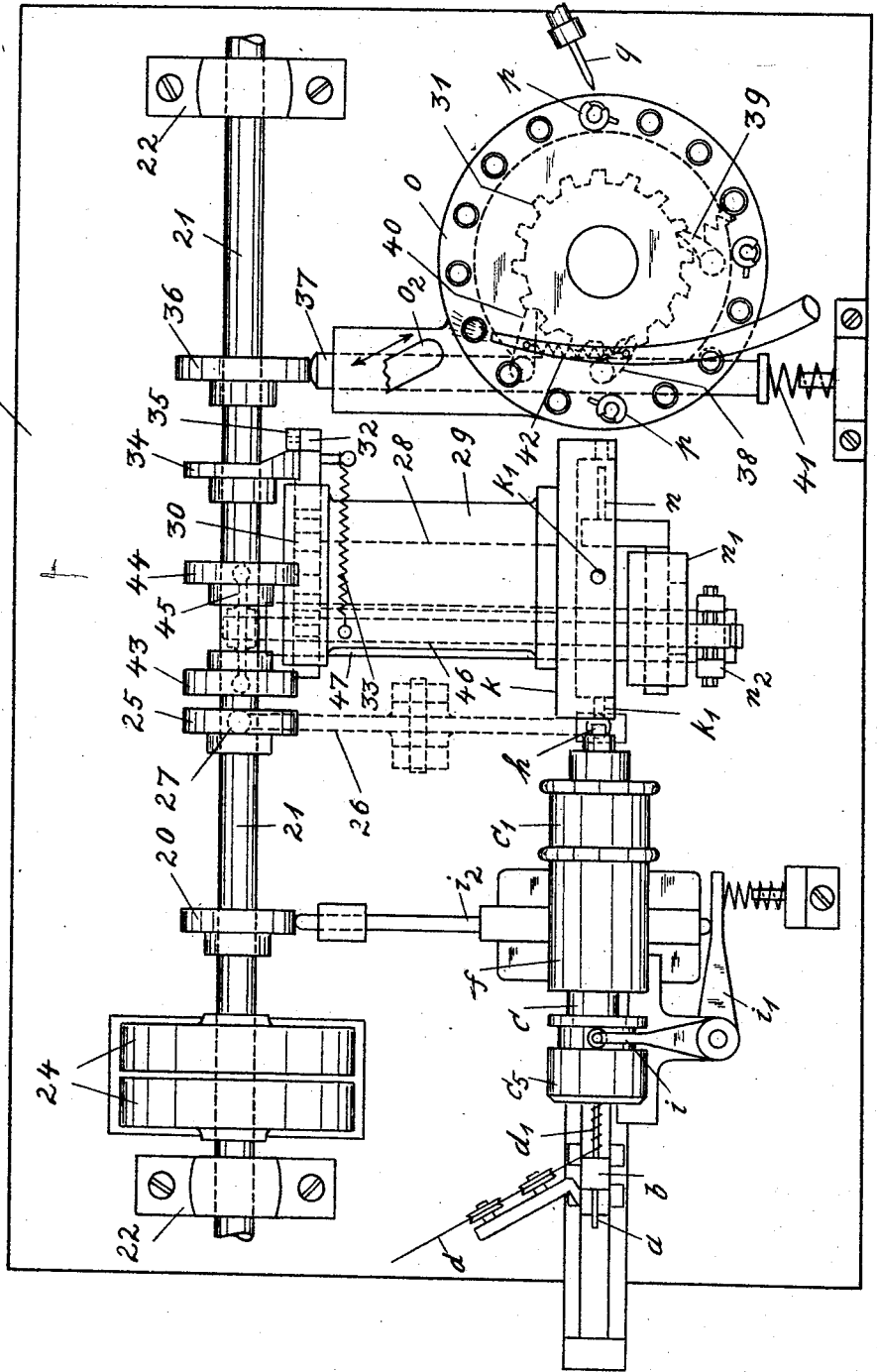

Patented Nov. 15, 1932

1,887,885

UNITED STATES PATENT OFFICE

BERNHARD FÖRSTER, OF PFORZHEIM, GERMANY

DEVICE FOR THE PRODUCTION AND INSERTION OF THE WIRE SPIRALS INTO THE RING SLEEVES OF SNAP RINGS

Application filed December 23, 1930, Serial No. 504,320, and in Germany July 11, 1930.

The snap rings commonly used for attaching watch chains and for fastening ornamental chains consist of a ring sleeve, in which the snap or the fastening element can be shifted, in opposition to the action of a wire spiral inserted in the ring sleeve, so that the mouth of the ring sleeve is open. If the fastening element is left to the action of the wire spiral, it closes the mouth of the ring sleeve.

The inserting of the wire spirals into the ring sleeves has hitherto been done by hand, which is a complicated and expensive procedure in the manufacture of the snap rings in large quantities.

The new method consists in that the wire spirals, produced on a winding mandrel and cut at equal length, are brought into a conveying arrangement, conveyed in the same successively in front of the inserting hole of the snap rings securely held in a plate fed stepwise, and then ejected from the conveying device by means of a ram and inserted into the snap ring sleeves.

The method is illustrated in the accompanying drawings in three forms of construction of the apparatus by way of example.

Fig. 1 shows in elevation an apparatus with vertical conveying drum charged radially.

Fig. 2 is a top plan view of Fig. 1.

Figure 4:
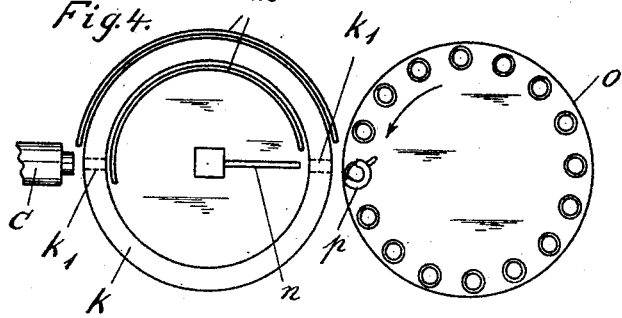

Fig. 4 in top plan view a horizontal conveying drum charged radially.

Figure 5:
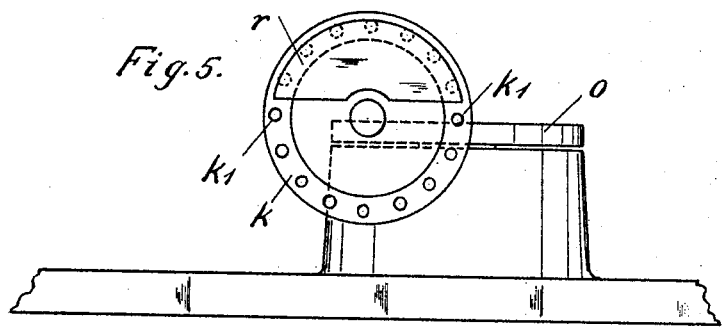

Fig. 5 shows in elevation, and

Figure 6:
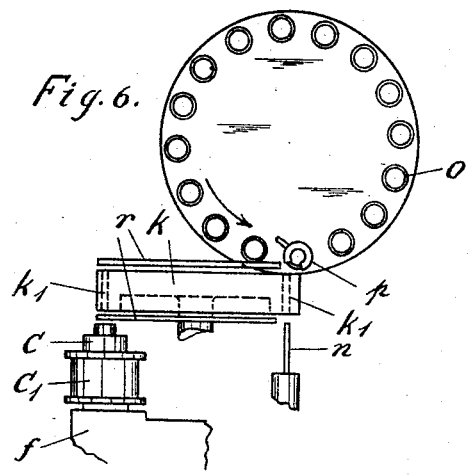

Fig. 6 in top plan view a conveying drum charged parallel to the axle.

Fig. 7 shows in elevation, partly in section, the apparatus for winding the wire spirals.

Fig. 8 shows in top plan view the chuck of the apparatus shown in Fig. 7, the cover being removed.

Fig. 9 is a top plan view of Fig. 1 with the driving shaft and the cams and eccentrics for actuating the tools and feeding mechanisms.

The manufacturing of the fine wire spirals designed to be inserted into the snap rings is effected with the aid of a winding mandrel $a$ rotatably mounted in a shiftable carriage $b$ and projecting into a hollow spindle $c$ (Fig. 7). The desired pitch is imparted to the wire spiral $d_1$ made of the wire $d$ by a piece $e$ of a wire spiral pushed on the mandrel $a$ and fastened at one end to a stationary bearing sleeve $b_1$. At the rotating of the mandrel $a$ the wire $d$ supplied to the mandrel is forced between the windings of the piece $e$ of wire spiral, whereby from the beginning the desired distance of the screw threads of the wire spiral is ensured. The spindle $c$, which is rotated in the bearing body $f$ by means of a belt placed over a pulley $c_1$, has at one end a head $c_2$ with a transverse milled slot $c_3$, in which two jaws $c_4$ are shiftably mounted. This head $c_2$ forms a chuck together with the jaws $c_4$ and with a shiftable sleeve $c_5$ engaging over the circumference of the head. The shiftable sleeve $c_5$ has a conical groove $c_6$, against which the outer ends of the jaws $c_4$ bear under the action of springs $c_8$ pressing onto the lateral arms $c_7$ of the jaws $c_4$ and mounted in transverse bores of the head $c_2$ (Fig. 8). The inner ends of the jaws $c_4$ are hollow and grip over the wire spiral $d_1$ tightly wound on the mandrel $a$. By means of a circular cover $c_9$ the transverse grooves $c_3$ in which the jaws $c_4$ are guided are shut off towards the outer side so that the jaws are securely held in the chuck. By shifting the sleeve $c_5$ in the direction of the arrow line A the jaws $c_4$ are pushed together and finally tighten the wire spiral $d_1$ so strongly on the mandrel $a$, that the rotations of the spindle $c$ are transmitted to the mandrel $a$.

During the winding of the wire spiral $d_1$ which then takes place the carriage $b$ travels backwards in the direction A, as the piece of wire spiral becomes longer between the jaws $c_4$ and the bearing sleeve $b_1$. At the moment, at which the clamping jaws $c_4$ open by the shifting of sleeve $c_5$ in opposite direction as the arrow line A, the carriage $b$ advances under the action of a pull spring $b_2$ towards the clamping chuck until it strikes against a stop $g$. During this movement the carriage pushes the wire spiral $d_1$ forward, so that a portion of the same projects from the open end $c_{10}$ of the hollow spindle $c$ and is severed by a knife $h$. When the jaws $c_4$ close then again, the operation begins afresh. The longer, that is for the more revolutions of the spindle $c$, the jaws $c_4$ remain closed, the greater will be the piece of wire spiral which is freshly wound, in order to be pushed forward at the opening of the jaws $c_4$.

The shifting of sleeve $c_5$, whereby the jaws $c_4$ are opened and closed, is effected in a manner known per se by means of a fork $i$ (Figs. 1 and 2), which engages in the annular groove of sleeve $c_5$, and to which movements are imparted by a lever $i_1$ on which acts a connecting rod $i_2$ operated by a cam disk 20 or the like.

The cam disk 20 is keyed on the driving shaft 21, journaled in bearings 22, which rest on the machine table 23 (Fig. 9). The shaft 21 receives its drive from a known counter shaft from which the driving belt extends over one of the two pulleys 24, one of which is loose and the other fixed. All movements of the tools and conveying mechanisms hereinafter described are effected by this cam shaft 21.

Opposite the open end $c_{10}$ of the spindle $c$ the conveying device is arranged.

Three forms of construction of such arrangements are illustrated by way of example in the accompanying drawings.

The conveying arrangement for instance consists, as shown in Figs. 1, 2 and 9, of a drum $k$, which has radially directed bores $k_1$ in its circumference, said bores extending through the crown of drum $k$ and receiving the end of the wire spiral coming from the spindle $c$, which wire spiral, after having been severed by the knife $h$, is completely pushed into the crown by the inclined face of the knife. The up and down movements of the knife $h$ are caused by means of the eccentric 25 keyed on the shaft 2 (Fig. 9). The double armed lever oscillatably mounted under the table plate 23 and bearing against the knife $h$ is pressed against the eccentric 25 through the intermediary of the vertical slide rod 27. The drum $k$ is stepwise rotated in such a manner that, for the reception of the end of the wire spiral each time an empty bore $k_1$ is at disposal. The drum $k$ is rotatably mounted by means of an axle 28 in the bearing element 29 (Fig. 9). On one end of this axle the drum $k$ is mounted and on the other end a ratchet wheel 30, similar to the ratchet wheel 31, which serves for shifting the plate $o$. The ratchet wheel 30 receives an intermittent forward movement by means of the slide 32 guided in the bearing element 29 and acted upon by a spring 33 on the disk 34 through the intermediary of a roller 35. The disk 34 is keyed on the shaft 21. The reciprocating movements of the slide 32 are transmitted with the aid of a control pawl onto the ratchet wheel 30 in exactly the same manner in which the reciprocating movements of the slide 37 actuated by the eccentric 36 are transmitted by means of the pawl 38. For the purpose of locking the ratchet wheel 30, after each feeding movement, locking pawls are also provided, similar to the locking pawls 39 and 40, which lock the ratchet wheel 31 of the plate $o$, after each feeding movement. The pieces of wire spiral are prevented from dropping out of the drum $k$, rotating for instance in the direction B (Fig. 1), by the arrangement of a stationary ring section $m$. If a bore $k_1$ has moved for instance 180°, the wire spiral is pushed out of this bore by means of a ram $n$ and inserted into a snap ring sleeve $p$ securely held on the plate $o$ which is also stepwise rotated. The feeding means for the plate $o$ have been above described. It is only necessary to add that the slide 37 is continually pressed by a spring 41 against the eccentric 36 and that during the shifting of the slide 37, which is caused by the spring 31, both the feed pawl 38 and also the locking pawl 40 can disengage from the ratchet wheel 31, whereas the locking pawl 39 secures the ratchet wheel 31 against backward rotation. During the feeding movement of the slide 37, which takes place against the action of the spring 41, the feeding pawl 38 again engages behind a tooth of the ratchet wheel 31 and the distance between the pawls 38 and 40, preferably interconnected by a wire spiral spring 42 and both oscillatably mounted on the slide 37, is so selected that at the end of the forward feeding movement the locking pawl 40 just bears against one of the teeth of the ratchet wheel 31 so that any further forward movement is prevented by the locking pawl 40. The feeding movement for the drum $k$ is constructed exactly similar to that just described. The ejecting movement of the ram $n$ shiftably mounted in the guide $n_1$ is effected by means of a rocker lever $n_2$ (Figs. 1, 2 and 9). The reciprocating movements of the rocker lever $n_2$ are also derived from the shaft 21. For this purpose two eccentrics 43 and 44 are keyed on this shaft with their eccentric portion diametrically oppositely directed. Below and between the two eccentric 43 and 44 a two armed lever 45 is arranged and bears with its two ends against the peripheries of the eccentrics 43 and 44 and is keyed on one end of the axle 46, which is oscillatably mounted in the bearing element 47 and carries on its other end the rocker lever $n_2$. The oppositely directed eccentrics impart a rocking movement to the lever 45, which is converted into a reciprocating movement of the ram $n$ by the transmission mechanisms described. The plate $o$ has small ring shaped cavities, into which the snap ring sleeves $p$ are placed by hand or by a suitable device. In order that a burr, which might be still present on the inserting aperture of the snap ring sleeve $p$, cannot prevent the fine wire spiral penetrating, each sleeve p placed on the plate is automatically reamed by means of small reamer q (Figs. 1 and 2). At both working points the snap ring sleeves p are securely held on the plate o during the working by holders o₁. The removing of the snap ring filled with a wire spiral is either effected by hand or by means of an ejector o₂ and an air jet o₃ (Fig. 2).

Figure 3:
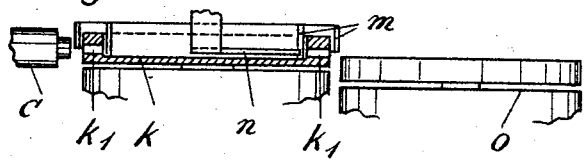
Fig. 3 shows in elevation.

As shown in Figs. 3 and 4 the drum k may be horizontal. In this case a ring section m is arranged not only in but also on the outer side of the drum crown.

The crown of drum o may also have bores k₁ extending parallel to the feed axis of the drum k (Figs. 5 and 6). Also in this case the wire spirals are held in the drum crown during the conveying by a stationary disk r.

I claim:

1. Apparatus for producing and inserting the wire spirals into the ring sleeve of snap rings, comprising in combination a winding mandrel on which a wire spiral is wound, a hollow spindle into which one end of said winding mandrel engages the other end serving as outlet for the wire spiral, a knife at the outlet end of said hollow spindle for cutting off a piece from said wire spiral, a stepwise rotated drum having continuous bores in its crown designed to receive the end of the wire spiral intermittently pushed out of said hollow spindle, a plate carrying the snap ring sleeves said plate moving along said drum, and a ram adapted to move through said continuous bores of said drum adapted to eject the wire spirals and insert the same into said snap ring sleeves.

2. Apparatus for producing and inserting the wire spirals into the ring sleeve of snap rings, comprising in combination a winding mandrel on which a wire spiral is wound, a hollow spindle into which one end of said winding mandrel engages the other end serving as outlet for the wire spiral, a knife at the outlet end of said hollow spindle for cutting off a piece from said wire spiral, a stepwise rotated drum having continuous radially directed bores in its crown designed to receive the end of the wire spiral intermittently pushed out of said hollow spindle, a plate carrying the snap ring sleeves said plate moving along said drum, a ram adapted to move through said continuous bores of said drum adapted to eject the wire spirals and to insert the same into said snap ring sleeves, and ring sections at the sides of said crown for shutting off the ends of said bores so that only the inlet and outlet points for the wire spirals are uncovered.

3. Apparatus for producing and inserting the wire spirals into the ring sleeve of snap rings, comprising in combination a winding mandrel on which a wire spiral is wound, a hollow spindle into which one end of said winding mandrel engages the other end serving as outlet for the wire spiral, a clamping jaw at that end of said hollow spindle into which said winding mandrel with the wire spiral engages adapted to transmit upon the wire spiral and said winding mandrel the rotations of said spindle, a knife at the outlet end of said hollow spindle for cutting off a piece from said wire spiral, a stepwise rotated drum having continuous radially directed bores in its crown designed to receive the end of the wire spiral intermittently pushed out of said hollow spindle, a plate carrying the snap ring sleeves said plate moving along said drum, a ram adapted to move through said continuous bores of said drum adapted to eject the wire spirals and to insert the same into said snap ring sleeves, and ring sections at the sides of said crown for shutting off the ends of said bores so that only the inlet and outlet points for the wire spirals are uncovered.

4. Apparatus for producing and inserting the wire spirals into the ring sleeve of snap rings, comprising in combination a winding mandrel on which a wire spiral is wound, a hollow spindle into which one end of said winding mandrel engages the other end serving as outlet for the wire spiral, a clamping jaw at that end of said hollow spindle into which said winding mandrel with the wire spiral engages adapted to transmit upon the wire spiral and said winding mandrel the rotations of said spindle, and a carriage in which said hollow spindle and said winding mandrel projecting from said clamping jaw are rotatably mounted, a knife at the outlet end of said hollow spindle for cutting off a piece from said wire spiral, a stepwise rotated drum having continuous radially directed bores in its crown designed to receive the end of the wire spiral intermittently pushed out of said hollow spindle, a plate carrying the snap ring sleeves said plate moving along said drum, a ram adapted to move through said continuous bores of said drum adapted to eject the wire spirals and to insert the same into said snap ring sleeves, and ring sections at the sides of said crown for shutting off the ends of said bores so that only the inlet and outlet points for the wire spirals are uncovered.

In testimony whereof I affix my signature.

BERNHARD FÖRSTER.